US011118657B2

(12) United States Patent
Louden

(10) Patent No.: US 11,118,657 B2
(45) Date of Patent: Sep. 14, 2021

(54) SYSTEM FOR A HYDRAULIC ROTATOR

(71) Applicant: Darrell Wayne Louden, Turners Station, KY (US)

(72) Inventor: Darrell Wayne Louden, Turners Station, KY (US)

(*) Notice: Subject to any disclaimer, the term of this patent is extended or adjusted under 35 U.S.C. 154(b) by 359 days.

(21) Appl. No.: 15/882,297

(22) Filed: Jan. 29, 2018

(65) Prior Publication Data
US 2018/0216704 A1 Aug. 2, 2018

Related U.S. Application Data

(60) Provisional application No. 62/451,247, filed on Jan. 27, 2017.

(51) Int. Cl.
*F16H 1/16* (2006.01)
*E02F 3/36* (2006.01)

(52) U.S. Cl.
CPC .............. *F16H 1/16* (2013.01); *E02F 3/3681* (2013.01)

(58) Field of Classification Search
CPC ........ F16H 1/16; E02F 3/3681; E02F 3/3686; E02F 3/369
See application file for complete search history.

(56) References Cited

U.S. PATENT DOCUMENTS

| | | | | | |
|---|---|---|---|---|---|
| 2,775,906 | A | * | 1/1957 | Elliott | F16K 31/05 74/625 |
| 4,848,425 | A | * | 7/1989 | Mercier | A01G 23/091 144/34.1 |
| 6,163,988 | A | * | 12/2000 | Pratt | E02F 3/3609 37/468 |
| 7,152,519 | B2 | * | 12/2006 | Dubreuil | B66C 3/005 92/106 |
| 7,735,530 | B1 | * | 6/2010 | Riha | A01G 23/095 144/4.1 |
| 8,544,562 | B2 | * | 10/2013 | Weyer | E02F 3/3663 173/218 |
| 8,631,595 | B2 | * | 1/2014 | McDonald | E02F 3/3681 37/417 |
| 8,677,961 | B2 | * | 3/2014 | Fischer | F01L 1/352 123/90.17 |
| 9,016,250 | B2 | * | 4/2015 | David | F01L 1/344 123/90.17 |
| 9,879,759 | B1 | * | 1/2018 | Mauro | F16H 55/22 |
| 2005/0061100 | A1 | * | 3/2005 | Inoue | B60K 23/08 74/425 |
| 2006/0005651 | A1 | * | 1/2006 | Laforest | B66F 11/00 74/425 |
| 2006/0117946 | A1 | * | 6/2006 | Dubreuil | B66C 3/005 92/106 |

(Continued)

*Primary Examiner* — Zakaria Elahmadi
(74) *Attorney, Agent, or Firm* — Duncan Galloway; Egan Greenwald PLLC; Kevin T. Duncan

(57) ABSTRACT

The invention relates generally to hydraulic rotator. More specifically, the invention relates to a system that provides for the successful three hundred and sixty-degree, clockwise or counterclockwise rotation of heavy weights. The system successfully bears the weight of the equipment, the hydraulic rotator, the attachment to the hydraulic rotator and the materials being targeted by the attachment, as well as the torque load and stress produced by the successful three-hundred-and-sixty-degree rotation.

20 Claims, 7 Drawing Sheets

(56) References Cited

U.S. PATENT DOCUMENTS

| | | | | |
|---|---|---|---|---|
| 2008/0179482 A1* | 7/2008 | van Amelsfoort | ...... | F16L 39/04 |
| | | | | 248/349.1 |
| 2012/0145104 A1* | 6/2012 | David | ...... | F01L 1/352 |
| | | | | 123/90.17 |
| 2012/0272764 A1* | 11/2012 | Pendleton | ...... | F04B 53/006 |
| | | | | 74/414 |
| 2014/0033842 A1* | 2/2014 | Morin | ...... | F16H 37/041 |
| | | | | 74/89.17 |
| 2014/0349800 A1* | 11/2014 | Correa Cely | ...... | F16H 3/724 |
| | | | | 475/149 |
| 2015/0053450 A1* | 2/2015 | Van Gemert | ...... | E02F 3/3681 |
| | | | | 173/218 |
| 2015/0331042 A1* | 11/2015 | Thurmaier | ...... | G01R 31/2601 |
| | | | | 324/750.25 |
| 2016/0072427 A1* | 3/2016 | Wu | ...... | F16H 1/16 |
| | | | | 74/380 |
| 2017/0265707 A1* | 9/2017 | Roderick | ...... | A47L 15/4225 |
| 2017/0314725 A1* | 11/2017 | Ozyuksel | ...... | F16H 57/039 |
| 2017/0335923 A1* | 11/2017 | Smith | ...... | A01G 25/09 |
| 2019/0345998 A1* | 11/2019 | Louis | ...... | F16D 65/58 |

\* cited by examiner

SYSTEM FOR A HYDRAULIC ROTATOR

CROSS-REFERENCE TO RELATED APPLICATION

The present invention claims benefit of priority to U.S. Provisional Application No. 62/451,247, entitled SYSTEM FOR A HYDRAULIC ROTATOR, Louden, filed Jan. 27, 2017, which is incorporated by reference herein in its entirety.

FIELD OF THE INVENTION

The present invention generally relates to a system for a hydraulic or electro-mechanical rotator. More specifically, a hydraulic or electro-mechanical rotator system is provided that is capable of sustained operation under the weight, torque load and stress of the combined elements often encountered in the field.

BACKGROUND OF THE INVENTION

Operators of equipment, such as skid steers, front-loaders, or excavators need to be able to have full confidence in the equipment they are operating. Individuals of ordinary skill in the art understand that reliability of skid steers, excavators and front-loaders revolves around the equipment's ability to support the immense amount of weight of not only itself, but of any attachment, and any potential object targeted by the attachment. For example, when attaching a Marshall Tree Saw, as disclosed in U.S. Pat. No. 5,479,971 to Lorry L. Marshall and advertised for sale at www.marshalltreesaw.com, for skid steers, the operator needs to be able to fully rely on their equipment to not falter under the weight of itself, the Marshall Tree Saw attachment, and the tree being cut down. Furthermore, when rotating the Marshall Tree Saw, the skid steer, front-loader or excavator must support the weight of the saw, and the torque load and the stress involved with the full three-hundred-and-sixty-degree rotation of the saw and the tree. The equipment needs to be strong enough to bear immense amounts of weight while stationary and moving.

Currently, operators of front-loaders, skid steers, and excavators cannot rely on their equipment to bear the weight of itself, an attachment, and the targeted item of the attachment, as well as the torque load and stress involved with any rotation. The Marshall Tree Saw or similar attachment can only be operated in the horizontal position thus making it harder to cut trees or brush from any position or to pick up and carry downed trees or brush. What is needed is a hydraulic rotator with a strong enough bearing to hold the immense weight of a front-loader, skid steer, or excavator, as well as any attachment and the object being targeted by the attachment. Furthermore, the bearing of the hydraulic rotator needs to bear the combination of the weight, stress, and the torque load of the equipment while rotating a full three hundred and sixty degrees, clockwise or counterclockwise.

SUMMARY OF THE INVENTION

The present invention is a system that operators of heavy equipment can rely on and resolves the deficiencies found in prior inventions. The system generally comprises universal quick attach plates, bearing mounting plates, a hydraulic motor attached to hydraulic hoses to power the system, a bearing that is strong enough to hold a substantial amount of weight, and a driving mechanism to drive the hydraulic rotator. The hydraulic rotator can be adapted for, but is not limited to, front-loaders, skid steers, and excavators. The hydraulic rotator will eliminate existing problems seen in present inventions such as a Marshall Tree Saw only cutting trees from a horizontal position and not possessing the capability to further pick up cut tree limbs and debris and move them without fear of the machine crippling under the immense weight. Further, the hydraulic rotator of the present invention eliminates operator concern for the degree of angle or stress grade for which the machine is set on. Operators of such heavy equipment can now rotate and move heavy items without the constant worry of their equipment being damaged from the constant operation of the equipment as well as the difficult maneuvering of the machine into position on a hillside or slope. The present invention saves operators time and money by providing a reliable hydraulic rotator capable of sustained operation under the weight, torque load and stress of the combined elements often encountered in the field, at any degree of angle. The invention also reduces maintenance and replacement costs. Although described herein principally in terms of a hydraulic system, the invention is not limited to only hydraulic systems and may be used in electro-mechanical and hybrid systems.

The present invention provides a system and apparatus for rotating accessories that would normally be fixedly attached to heavy machinery. For example, the Marshall Tree Saw described above, or any other similar attachment, would typically be fixedly attached to a piece of machinery such as a front-loader in such a manner that it could not be rotated with respect to the front-loader. The attachment would be secured to the arms of the front-loader in a fixed manner and could only be moved or adjusted as provided by the arms of the front-loader. The same would be true if the attachment were used with a tractor, BOBCAT, or other similar piece of equipment. Even when used with quick attachment systems such as those provided by JOHN DEERE and BOBCAT, the attachment would only be able to move as provided by the equipment on which it was attached. The Marshall Tree Saw and front-loader are used only as an exemplary attachment and equipment respectively and may instead be substituted with any suitable attachment or equipment/machinery.

The present invention is attached to equipment, such as a front-loader, by an inner quick attach plate. A drive assembly comprising a drive motor and a bearing are disposed on the exterior of the inner quick attach plate that is secured to the equipment, and may also be secured to an intermediate bearing plate. The bearing, which may be a slew ring bearing, is secured to an outer quick attach plate, and may also be secured to a second intermediate bearing plate such that the drive assembly, including drive motor and bearing, are not directly attached to the inner and outer quick attach plates. The assembly is able to rotate the outer quick attach plate 360 degrees with respect to the inner quick attach plate and is able to withstand the substantial load that would typically be placed on the drive assembly by the weight of the outer quick attach plate and any attachment. The drive assembly may be powered by a hydraulic drive motor that uses either a cogwheel gear or worm gear drive to rotate the toothed outer portion of the bearing.

The present invention utilizes existing quick attach systems but enables the attachment itself to be rotated with respect to its mounting frame. For example, when attached using the hydraulic rotator system of the present invention, a Marshall Tree Saw attached to a front-loader would be able to rotate 360 degrees with respect to the front-loader. The rotation point may be adjusted such that the bearing in the drive system of the present invention is offset with respect to the center of the quick attach plate, providing or ease of use in small spaces or near structures.

In a first embodiment, the present invention provides a hydraulic rotator apparatus comprising: an inner quick attach plate adapted to secure to an equipment mounting plate; an outer quick attach plate adapted to secure to an attachment; a drive assembly comprising a drive motor and a bearing, the drive motor secured to the inner quick attach plate and the bearing secured to the outer quick attach plate; and wherein the drive assembly is adapted to rotate the outer quick attach plate relative to the inner quick attach plate.

The hydraulic rotator apparatus may further comprise wherein the equipment mounting plate is secured to an operating end of one of a skid steer, front-loader, or tractor. The drive motor may be secured to an inner bearing plate, and the inner bearing plate may be secured to the inner quick attach plate. The bearing may be secured to an outer bearing plate, and the outer bearing plate may be secured to the outer quick attach plate. The drive motor may be a hydraulic motor. The hydraulic motor may be connected to one of a skid steer, excavator, or front-loader by a set of hydraulic hoses which provide power to the hydraulic motor. The bearing may comprise an inner bearing surface and an outer toothed surface. The drive motor may comprise a drive gear having a set of drive teeth adapted to mechanically interface with the outer toothed surface of the bearing to transmit power from the drive motor to the bearing. The drive gear may be one of a worm gear or a cogwheel gear. The bearing is a slew ring bearing. The drive gear may be adapted to drive the bearing whereby the bearing and the outer quick attach plate are rotated about an axis perpendicular to the inner quick attach plate. The drive assembly may be a worm drive disposed between the outer and inner universal quick attach plates.

The hydraulic rotator apparatus may further comprise: a housing having an interior and an exterior and secured to the inner quick attach plate; wherein the bearing is secured to the housing and to the outer quick attach plate; and wherein the drive assembly further comprises a drive gear adapted to transfer power from the drive motor to the bearing. The drive motor may be disposed in the interior of the housing. The bearing may be secured to a bearing plate, and wherein the bearing plate is secured to the outer quick attach plate. The drive assembly may further comprise a gearbox. The drive assembly may be adapted to rotate the outer quick attach plate 360 degrees about an axis perpendicular to the inner quick attach plate. The bearing may be a slew ring bearing, wherein the bearing is secured to the housing and to the outer quick attach plate such that the outer quick attach plate may rotate with respect to the housing. The bearing may be offset with respect to the center of the outer quick attach plate.

In a second exemplary embodiment the present invention provides a hydraulic rotator apparatus capable of sustained operation under the weight, torque load and stress of the combined elements often encountered in the field, the apparatus comprising: a machine side and attachment side universal quick attach plate, a first and second bearing mounting plate, a first and second hydraulic hose, a hydraulic motor, a bearing, and a driving mechanism. The machine side universal quick attach plate is mounted on a first end to a second end of an equipment attach plate which further comprises two sets of equipment arms that further connect the hydraulic rotator apparatus to the skid steer, front-loader, or tractor. The machine side universal quick attach plate is further connected on a second end to a first end of the first bearing mounting plate via welding and stitch bolting with a first set of two bolts and bolted in place as per bearing requirements. The first bearing mounting plate is connected on a second end to the first end of the bearing via an inner set of bearing bolts, as per bearing specifications and requirements.

The bearing is a slewing or slew ring bearing with a toothed wheel that can be modified and scaled to any size appropriate depending on the operator's specifications. Hence, the number of inner set of bearing bolts will be determined on the specifications of the slewing or slew ring bearing being used. The bearing is further connected on a top end to the bottom end of the driving mechanism, which in this first exemplary embodiment is a worm drive. The driving mechanism and the bearing's teeth mesh together to not only connect them but to also drive the full three-hundred and sixty-degree rotation of the hydraulic rotator apparatus. The driving mechanism is further connected on a first end to the first end of the hydraulic motor via a spline shaft and a bolted flange. The hydraulic motor is further connected on a second end to the first end of the first and second hydraulic hoses. The first hydraulic hose is connected on a second end to the skid steer, excavator or front-loader via a female flat-faced coupler to which the first hydraulic hose is sealed to, and ultimately drives the power to the hydraulic rotator. The second hydraulic hose is connected on a second end to the skid steer, excavator, or front-loader via a male flat-faced coupler, that filters the power back into the equipment, and then recirculates the power back out through the first hydraulic hose. The bearing further comprises a bearing cover that surrounds the bearing and an inner and outer set of bearing bolts, which number is determined on the specifications of the slewing or slew ring bearing being used. The inner and outer set of bearing bolts are offset of one another. The bearing is further connected on a second end to the first end of the second bearing mounting plate via the outer set of bearing bolts. The second bearing mounting plate is further connected on a second end to the first end of the attachment side universal quick attach plate via welding and stitch bolting with a second set of two bolts and is bolted in place as per bearing requirements. The attachment side universal quick attach plate is further mounted on a second end to whatever attachment the operator uses.

In a third embodiment, the present invention provides a larger hydraulic rotator apparatus capable of sustained operation under the weight, torque load and stress of the combined elements often encountered in the field, the apparatus generally comprising: a machine side and attachment side universal quick attach plate; a second bearing mounting plate, a first and second hydraulic hose, a housing, a bearing, a driving mechanism housing further comprising: a hydraulic motor, a first driving mechanism, and a second driving mechanism further comprising a gear. The machine side and attachment side universal quick attach plates are the same as in the first exemplary embodiment, but attach differently. The machine side universal quick attach plate is still mounted on a first end directly to the equipment attachment plate of the skid steer, front-loader, or excavator but is welded on a second end to a first end of the housing. The attachment side universal quick attach plate is still welded and stitch bolted with a second set of two bolts on a first end to the second end of the second bearing mounting plate, and is further mounted on a second end to whatever attachment the operator uses.

The first and second hydraulic hoses are the same as in the first exemplary embodiment, connecting on a second end to the equipment being used, and on a first end to the hydraulic motor. The hydraulic motor is also the same as in the first exemplary embodiment, except that it is in a different location on the hydraulic rotator apparatus. The hydraulic motor is now located inside the housing, and further within the driving mechanism housing. The hydraulic motor connects on a first end to the first driving mechanism via a spline shaft and a bolted flange and on a second end to the first end of the first and second hydraulic hoses. The housing is welded on a first end to the second end of the machine side universal quick attach plate and is bolted on a second end to the first end of the slewing or slew ring bearing via the inner set of bearing bolts. The housing further comprises a driving mechanism housing which is welded to the top and bottom extensions of the housing and is bolted to the inside of the second end of the housing.

The driving mechanism further comprises a hydraulic motor, a first driving mechanism, and a second driving mechanism further comprising a gear. The first driving mechanism is a worm drive similar to the worm drive used in the first exemplary embodiment, but there are some distinctions. The first driving mechanism (worm drive) is still connected on a first end to the first end of the hydraulic motor via a spline shaft and a bolted flange. However, the first driving mechanism is further connected on a bottom end to a worm wheel via the meshing of the worm wheel teeth and the first driving mechanism teeth. The worm wheel further comprises an output shaft located in the middle of it. The second driving mechanism is a spur drive which latches on a first end to the output shaft of the worm wheel. The second driving mechanism protrudes through the second end of the housing and is located on a second end between the outside of the second end of the housing and the first end of the second bearing mounting plate. The second driving mechanism is bolted on a second end to the outside of the second end of the housing and further comprises a gear. The gear is always touching the bearing via the teeth of both the bearing and the gear which drives the full three-hundred and sixty-degree rotation of the hydraulic rotator apparatus in the second embodiment.

The bearing is again a slewing or slew ring bearing capable of holding immense amounts of weight. The bearing is connected on a first end to the outside of the second end of the housing via the inner set of bearing bolts and is connected on a second end to the first end of the second bearing mounting plate via the outer set of bearing bolts which ultimately bolt to the second end of the second bearing mounting plate. The inner and outer bearing bolts offset one another and the amount of each is determined on the specifications requested by the operator. Advantageously, depending on the operator's preference, the slewing or slew ring bearing can be located in the center of the housing, or offset to the left or the right. When offset to the left or the right, it will allow the operator more rotation flexibility for working closely along fences and buildings.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention but are intended to be exemplary and for reference.

DETAILED DESCRIPTION OF THE INVENTION

Figure 1:
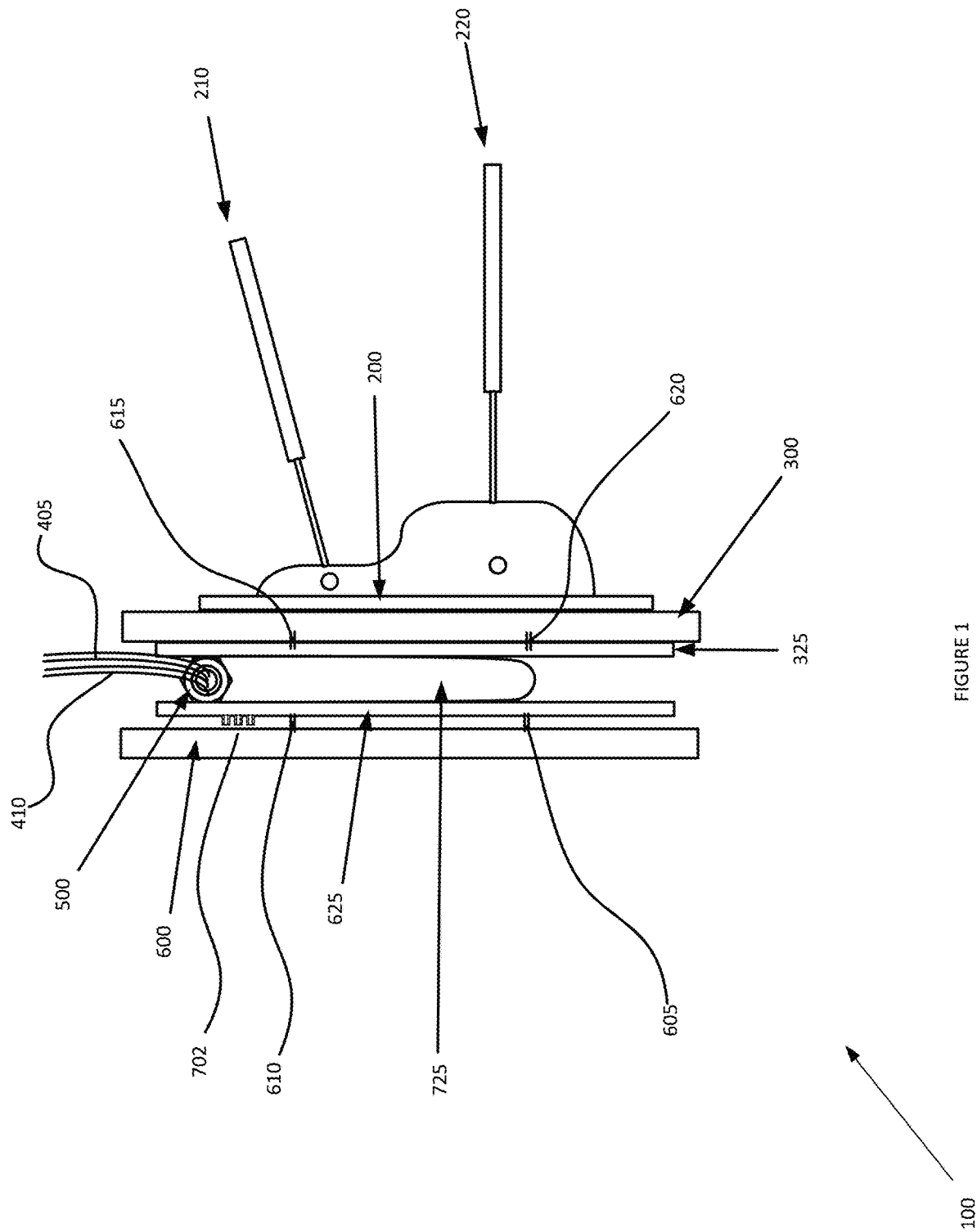
FIG. 1 is a side perspective view of the first exemplary embodiment of the hydraulic rotator 100 according to the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

There are two similar but unique embodiments of the hydraulic rotator apparatus. In a first exemplary embodiment, the hydraulic rotator is more compact and lighter because there is only one driving mechanism present, which is a worm drive. One exemplary worm drive is a TPA WD-LA series 0343/single row drive. The use of a worm drive lessens the weight of the overall system because the hydraulic rotator apparatus does not require a housing further comprising a driving mechanism housing.

According to a first exemplary embodiment of the present invention, there is provided a hydraulic rotator apparatus capable of sustained operation under the weight, torque load and stress of the combined elements often encountered in the field and can rotate a full three-hundred and sixty degrees, clockwise or counter clockwise. The hydraulic rotator comprises a machine side and attachment side universal quick attach plate, a first and second bearing mounting plate, a driving mechanism, a hydraulic motor, a first and second hydraulic hose, and a bearing. The attachment side and machine side universal quick attach plates are universal and attach to a skid steer, front-loader, excavator, or any equipment of the like, as well as any attachment. Depending on the equipment used, the quick attach plates will be compatible to fit to said equipment. There is a machine side universal quick attach plate that is mounted on a first end, directly to the equipment attachment plate of the skid steer, front-loader, or excavator. The machine side universal quick attach plate is further connected on a second end to a first end of the first bearing mounting plate via welding and stitch bolting with a first set of two bolts. The first bearing mounting plate is further connected on a second end to the first end of the bearing via an inner set of bearing bolts. The attachment side universal quick attach plate is connected on a first end to a second end of the second bearing mounting plate via welding and stitch bolting with a second set of two bolts located on the second bearing mounting plate and is further mounted on a second end to whatever attachment the operator uses. The second bearing mounting plate is further connected on a first end to the bearing via an outer set of bearing bolts that ultimately bolt to the second end of the second bearing mounting plate.

The driving mechanism of the first exemplary embodiment of the present invention is a worm drive. The worm drive, for example, being a TPA WD-LA series 0343/single row or smaller version. The worm drive is located between the second end of the first bearing mounting plate and the first end of the second bearing mounting plate. The worm drive is connected on the bottom to the bearing via a bearing cover. The worm drive is connected on a first end to a first end of the hydraulic motor via a spline shaft and a bolted flange. For example, the spline shaft being a SAE 6B spline shaft and the bolted flange being a SAE "A" 2 bolt flange. The worm drive is powered via the hydraulic motor. The hydraulic motor, for example, being a Parker TE Series Hydraulic motor, sold on www.parker.com and whose manual is found at http://www.parker.com/literature/Hydraulic %20Pump %20&%20Motor/_TE_Series_Update_4_2013.pdf. The hydraulic motor is further connected on a second end to the first end of the two hydraulic hoses.

The first hydraulic hose is connected to the skid steer, excavator or front-loader at a second end. Said second end is a female flat-faced coupler to which the first hydraulic hose is sealed to, and ultimately drives the power to the hydraulic rotator. The first hydraulic hose is connected on a first end to the second end of the hydraulic motor. The second hydraulic hose is connected to the skid steer, excavator, or front-loader on a second end. Said second end is a male flat-faced coupler, that filters the power back into the equipment, and then recirculates the power back out through the first hydraulic hose. Said second hydraulic hose is additionally connected on a first end to the second end of the hydraulic motor. The hydraulic hoses being ⅜" SAE 100R2AT 4000PSI Max WP hoses.

The bearing is a slewing or slew ring bearing that can bear immense amounts of weight, up to 80,000 pounds. The slewing or slew ring bearing would preferably be a WD-LA-0343/3-06371, sold at http://www.goimo.com/Product_details.1488.0.html?&nid=1495&tcid=10. The slewing or slew ring bearing comprises a toothed wheel and can be modified and scaled to any size appropriate depending on the driving mechanism being utilized. The teeth of the slewing or slew ring bearing and the teeth of the worm drive mesh together and rotate in line with one another to drive the full three-hundred and sixty degree, clockwise or counter clockwise, rotation of the hydraulic rotator apparatus. The top end of the slewing or slew ring bearing and the bottom end of the worm drive connect via their teeth which is encapsulated by a bearing cover. The slewing or slew ring bearing is connected on a first end to the second end of the first bearing mounting plate via an inner set of bearing bolts. The slewing or slew ring bearing is further connected on a second end to first end of the second bearing mounting plate via an outer set of bearing bolts that ultimately bolt to the second end of the second bearing mounting plate. The inner and outer set of bearing bolts offset one another and the number of each set of bolts is based on the specifications of the slewing or slew ring bearing bearing being used.

According to a second embodiment of the present invention, there is provided a hydraulic rotator apparatus that can bear immense weights and rotate a full three-hundred and sixty degrees. In the second embodiment, there is a first and second driving mechanism, being a worm drive and a spur drive. Use of the spur drive in conjunction with the worm drive increases the size and the weight of the hydraulic rotator due to the need for a housing and a driving mechanism housing. According to the second embodiment, the hydraulic rotator comprises machine side and attachment side universal quick attach plates, a second bearing mounting plate, a bearing, a first and second hydraulic hose, a housing, and a driving mechanism housing further comprising: a hydraulic motor, a first driving mechanism, and a second driving mechanism further comprising a gear.

The machine side and attachment side universal quick attach plates are the same as in the first exemplary embodiment, but attach differently. The machine side universal quick attach plate is mounted on a first end, directly to the equipment attachment plate of the skid steer, front-loader, or excavator. The machine side universal quick attach plate is welded on a second end to the housing. The attachment side universal quick attach plate is still welded and stitch bolted with a second set of two bolts on a first end to the second end of the second bearing mounting plate, and is further mounted on a second end to whatever attachment the operator uses. The hydraulic hoses are the same as in the first exemplary embodiment, connecting on a second end to the equipment being used, and on a first end to the hydraulic motor. The hydraulic motor is also the same as in the first exemplary embodiment, except that it is in a different location on the hydraulic rotator apparatus. The hydraulic motor is now located inside the housing, and further within the driving mechanism housing, and connects on a first end to the first driving mechanism via a spline shaft and a bolted flange and on a second end to the first end of the first and second hydraulic hoses.

The housing is welded on a first end to the second end of the machine side universal quick attach plate and is bolted on a second end to the first end of the slewing or slew ring bearing via the inner set of bearing bolts. The housing further comprises a driving mechanism housing which is welded to the top and bottom extensions of the housing and is bolted to the inside of the second end of the housing. The driving mechanism housing further comprises the hydraulic motor, a first driving mechanism, and a second driving mechanism further comprising a gear. The structure of the driving mechanism housing, the contents therein, are similar to a WPA(FCA) worm gear speed reducer gearbox, as seen and sold at http://www.globalsources.com/si/AS/Hangzhou-Yangfeng/6008841189304/pdtl/Wpafca-Worm-Gear-Speed-Reducer-Gearbox/1059186379.htm. The first driving mechanism according to the second embodiment of the present invention is again a worm drive, but there are differences. The first driving mechanism (worm drive) is still connected on a first end to the first end of the hydraulic motor via a spline shaft and a bolted flange. However, the first driving mechanism is further connected on a bottom end to a top end of a worm wheel via the meshing of the worm wheel teeth and the first driving mechanism teeth. The worm wheel further comprises an output shaft located directly in the middle of it. The second driving mechanism is a spur drive which latches on a first end to the output shaft of the worm wheel. The second driving mechanism protrudes through the second end of the housing and is located on a second end between the outside of the second end of the housing and the first end of the second bearing mounting plate. The second driving mechanism is bolted on the second end to the outside of the second end of the housing and further comprises a gear. The gear is always touching the bearing via the teeth of both the bearing and the gear which drives the full three-hundred and sixty-degree, clockwise or counter clockwise, rotation of the hydraulic rotator apparatus in the second embodiment.

The bearing is again a slewing or slew ring bearing capable of holding immense amounts of weight. The bearing is connected on a first end to the outside of the second end of the housing via the inner set of bearing bolts and is connected on a second end to the first end of the second bearing mounting plate via the outer set of bearing bolts, which ultimately bolt to the second end of the second bearing mounting plate. The amount of inner and outer bearing bolts is determined on the specifications requested by the operator. Advantageously, depending on the operator's preference, the bearing can be mounted in the center of the housing, or offset to the left or the right. When mounted offset to the left or the right, it will allow the operator more rotation flexibility for working closely along fences and buildings.

The quick attach plates are universal; thus, a myriad of attachments could be mounted to the hydraulic rotator. Preferably, these attachments are all fully supported by the hydraulic rotator while stationary, rotating, or moving, and are all mounted to the second end of the attachment side universal quick attach plate. These include but are not limited to the following: a digger auger for drilling, a post driver for driving fence posts and similar items into the earth, a Marshall Tree Saw for cutting down and moving trees or tree limbs, pallet forks to haul and move any items necessary, a bucket for rotating and dropping items into a dumpster etc., a blade angling to plow anything from snow to hay, a rotary mower or bush hog which would allow the operator to not only cut the grass on the ground, but also with the slewing or slew ring bearing offset to one side, the operator has more flexibility for cutting any brush positioned directly next to a fence or building, or hay bale spears to move hay bales from one location to another. Specifically, all these items can be picked up and moved, then rotated into a dumpster etc., rather than the operator having to unload the items manually, then manually lift them into the dumpster or lift them onto their final location.

With reference first to FIG. 1, a side perspective view of the first exemplary embodiment of the hydraulic rotator apparatus ("HRA") 100 according to the present invention is provided. The HRA 100 comprises a machine side universal quick attach plate 300, a first bearing mounting plate 325, a first hydraulic hose 405, a second hydraulic hose 410, a hydraulic motor 500, a second bearing mounting plate 625, an attachment side universal quick attach plate 600, and bearing cover 725. The HRA 100 further comprises a driving mechanism 550 and a bearing 700 which are not visible in this figure.

The machine side universal quick attach plate 300 is mounted on a first end to the second end of the equipment attachment plate 200 via the universal attachment feature. The operator of the skid steer, excavator or front-loader will simply drive the second end of the equipment attachment plate 200 up to the first end of the machine side universal quick attach plate 300 and the two will mount together according to the universal feature. The equipment attachment plate 200 further connects on a first end to the tractor, skid steer, or excavator via a first set of arms 210 and a second set of arms 220. The machine side universal quick attach plate 300 is further connected on a second end to a first end of a first bearing mounting plate 325 via welding and stitch bolting with a first set of two bolts 615 and 620. The first bearing mounting plate 325 is connected on a second end to the first end of the bearing 700 via an inner set of bearing bolts 701. The inner set of bearing bolts 701 are not visible in FIG. 1, but they are offset of the outer set of bearing bolts 702, which are visible in this Figure. The bearing cover 725 surrounds the slewing or slew ring bearing 700, a second end of the inner set of bearing bolts 701, and a first end of the outer set of bearing bolts 702. The outer set of bearing bolts 702 connect the bearing 700, on a second end to the first end of the second bearing mounting plate 625 by bolting to the second end of the second bearing mounting plate 625.

The hydraulic motor 500 is connected on a second end to the first end of the first hydraulic hose 405 and the first end of the second hydraulic hose 410. The first hydraulic hose 405 is connected on a second end to the skid steer, excavator or front-loader. Said second end is a female flat-faced coupler to which the first hydraulic hose 405 is sealed to, and ultimately drives the power to the hydraulic motor 500. The second hydraulic hose 410 is connected on a second end to the skid steer, excavator, or front-loader. Said second end is a male flat-faced coupler, that filters the power back into the equipment, and then recirculates the power back out through the second hydraulic hose 410 to the hydraulic motor 500. The attachment side universal quick attach plate 600 is connected on a first end to the second end of the second bearing mounting plate 625 via welding and stich bolting with a second set of two bolts 605 and 610. The attachment side universal quick attach plate 600 is further mounted on a second end to whatever attachment the operator uses via the universal attachment feature.

Figure 2:
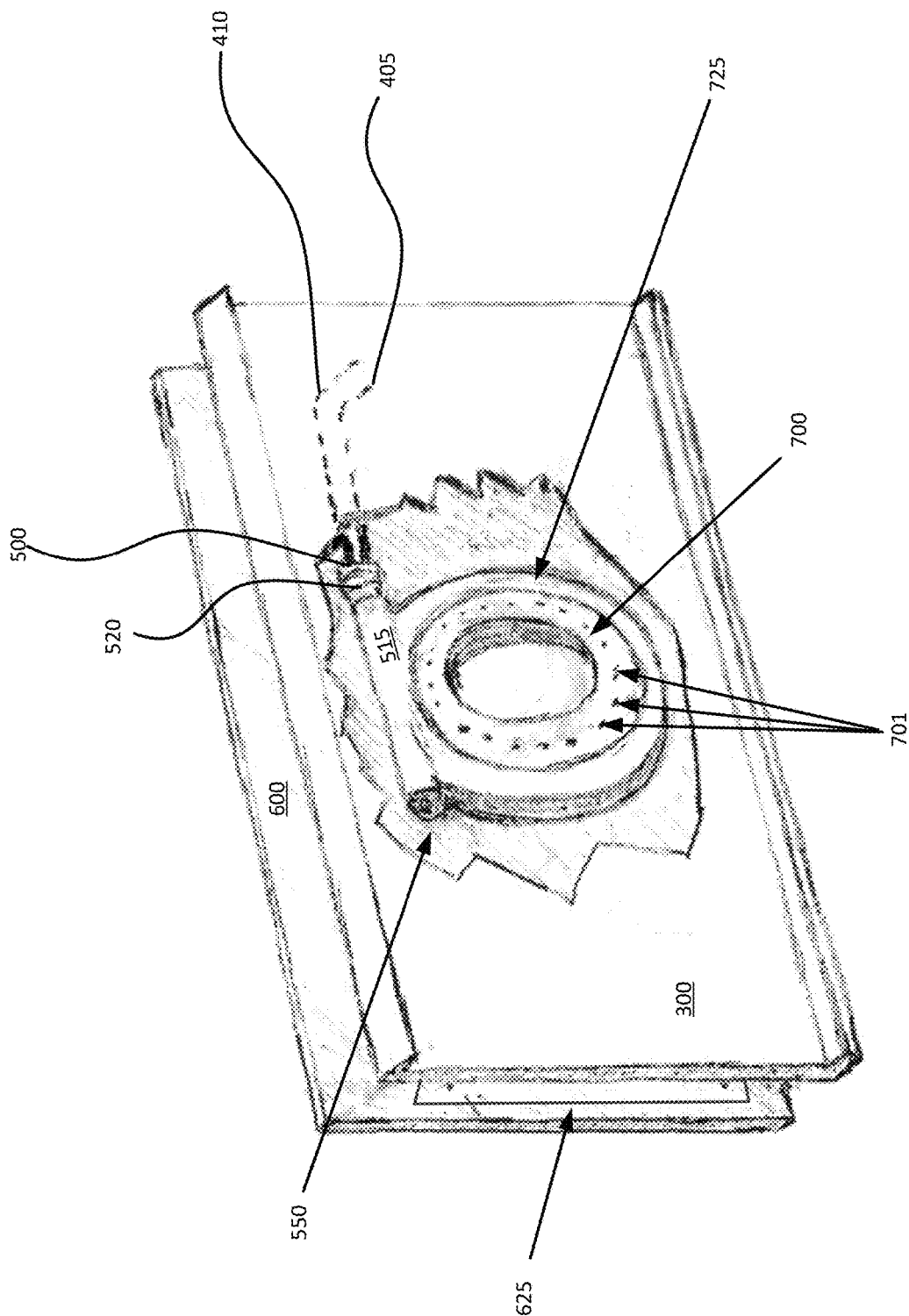
FIG. 2 is a partial cutaway view of the first exemplary embodiment of the hydraulic rotator 100 according to the present invention.

With reference now to FIG. 2, a partial cutaway view of the first exemplary embodiment of the HRA 100 according to the present invention is provided. The first hydraulic hose 405 and the second hydraulic hose 410 are connected at a first end to the second end of the hydraulic motor 500 and ultimately power the driving mechanism 550, a worm drive. The hydraulic motor 500 is connected on a first end to the first end of the driving mechanism 550 and on a second end to the first end of the first hydraulic hose 405 and the second hydraulic hose 410. The driving mechanism 550 is connected on a first end to the first end of the hydraulic motor 500 via a spline shaft 515 and a bolted flange 520. The driving mechanism 550 is connected on a bottom end to the bearing 700 via the teeth on the driving mechanism 550 and the teeth on the bearing 700. The bearing cover 725 surrounds the bearing 700, and the offset inner 701 and outer set of bearing bolts 702. The inner set of bearing bolts 701 bolt the bearing 700 to the second end of the first bearing mounting plate 325. The outer set of bearing bolts 702 connect the bearing 700 on a second end to the first end of the second bearing mounting plate 625 by bolting to the second end of the second bearing mounting plate 625. The attachment side universal quick attach plate 600 is the same as the machine side universal quick attach plate 300 based on the specifications requested by the operator.

Figure 3:
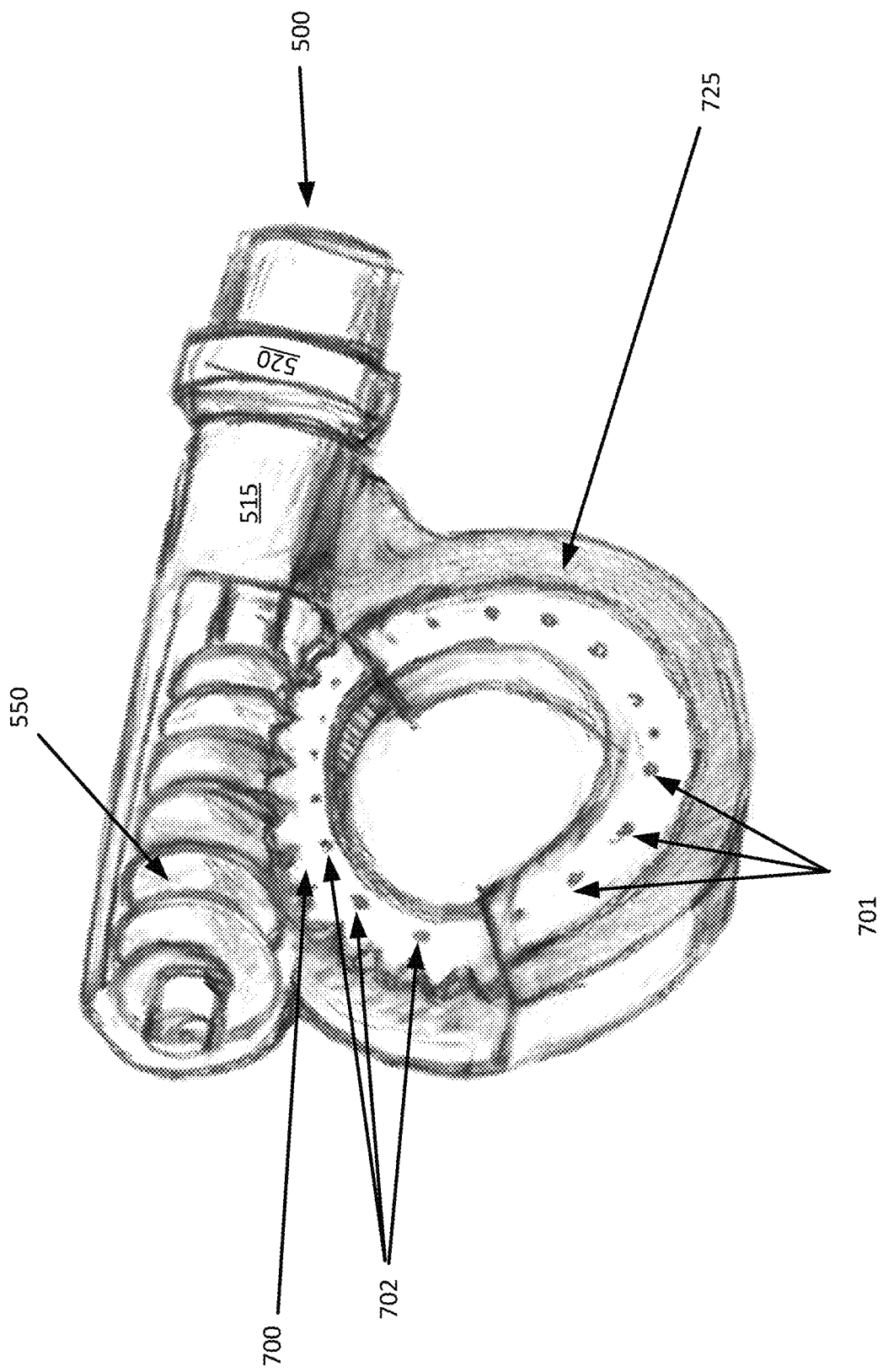
FIG. 3 is a partial cutaway view of the driving mechanism 550 and bearing 700 of the first exemplary embodiment of the hydraulic rotator 100 according to the present invention.

With reference now to FIG. 3, a partial cutaway view of the driving mechanism 550 and bearing 700 of the first exemplary embodiment of the HRA 100 according to the present invention is provided. The inner set of bearing bolts 701 bolt the bearing 700 to the second end of the first bearing mounting plate 325. The driving mechanism, 550 is connected on a first end to the first end of the hydraulic motor 500 via a spline shaft 515 and a bolted flange 520. The driving mechanism 550 is connected on a bottom end to the top end of the bearing 700 via the teeth on the bearing 700 and the teeth on the driving mechanism 550 which mesh together to drive the rotation of the HRA 100. The driving mechanism 550 and the bearing 700 are further connected via the bearing cover 725. The outer set of bearing bolts 702 are offset the inner set of bearing bolts 701 and connect the bearing 700 on a second end to the first end of the second bearing mounting plate 625 by bolting to the second end of the second bearing mounting plate 625.

Figure 4:
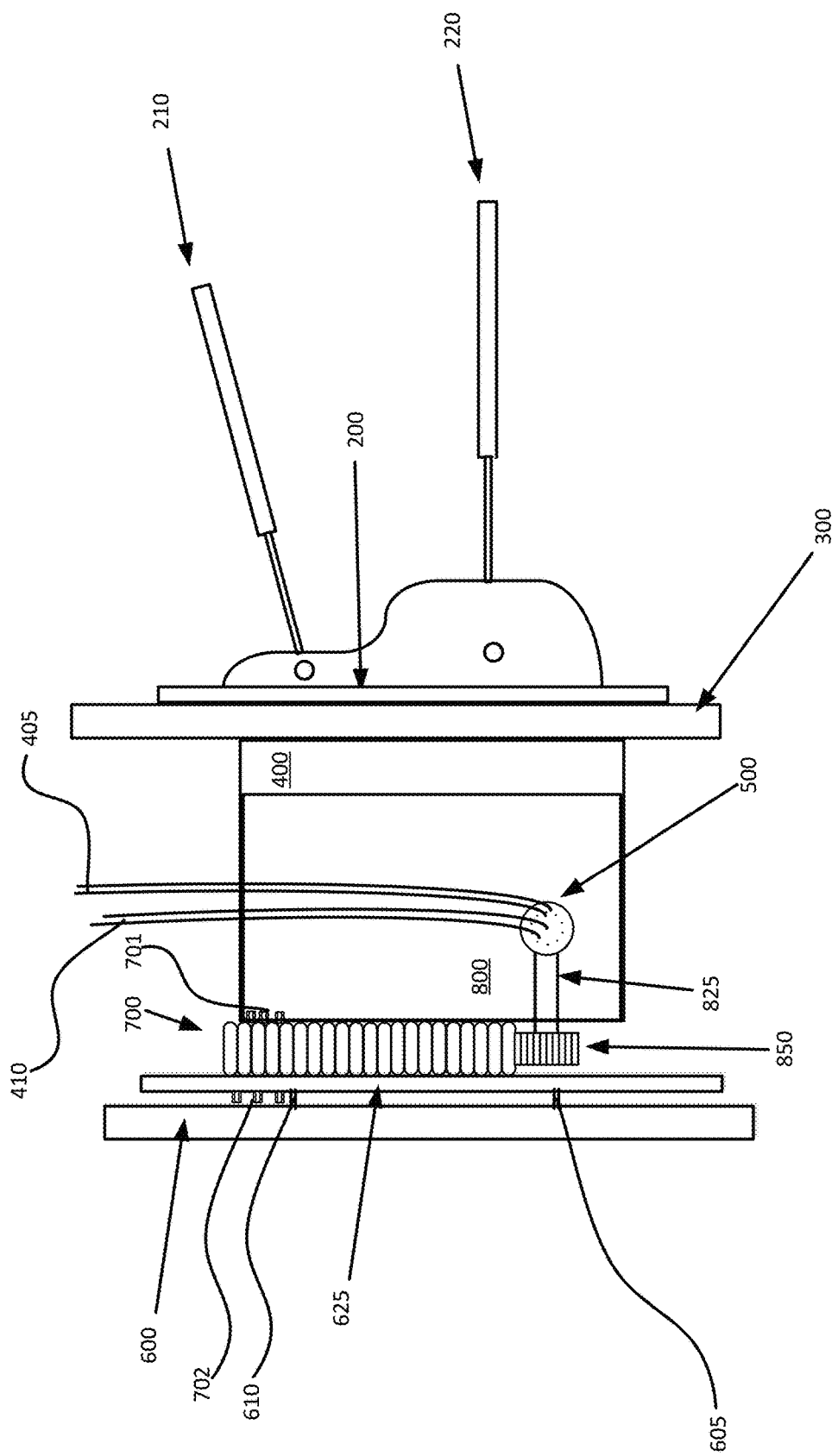
FIG. 4 is a side perspective view of a second embodiment of a hydraulic rotator 100 according to the present invention.

With reference now to FIG. 4, a side perspective view of a second embodiment of the HRA 100 according to the present invention is provided. The second embodiment of the HRA 100 comprises an machine side universal quick attach plate 300, a housing 400, a first hydraulic hose 405, a second hydraulic hose 410, a second bearing mounting plate 625, an attachment side universal quick attach plate 600, a bearing 700, and a driving mechanism housing 800, further comprising: a hydraulic motor 500, a first driving mechanism 815, and a second driving mechanism 825 further comprising a gear 850. The machine side universal quick attach plate 300 is mounted on a first end to the second end of the equipment attachment plate 200 via the universal attachment feature. The equipment attachment plate further connects on a first end to the tractor, skid steer, or excavator via a first set of arms 210 and a second set of arms 220. The machine side universal quick attach plate 300 is further welded on a second end to a first end of the housing 400. The housing 400 is connected on a second end to a first end of the bearing 700, a slewing or slew ring bearing, via an inner set bearing bolts 701. The outer set of bearing bolts 702 connect the bearing 700 on a second end to the first end of the second bearing mounting plate 625 by bolting to the second end of the second bearing mounting plate 625. The amount of inner and outer bearing bolts, 701 and 702, is determined on the specifications requested by the operator. Depending on the operator's preference, the bearing 700 can be mounted in the center of the housing 400, or offset to the left or the right. When mounted offset to the left or the right, it will allow the operator more rotation flexibility for working closely along fences and buildings. The attachment side universal quick attach plate 600 is connected on a first end to the second end of the second bearing mounting plate 625 via welding and stitch bolting with a second set of two bolts 605 and 610. The attachment side universal quick attach plate 600 is further mounted on a second end to whatever attachment the operator uses via the universal attachment feature.

The first hydraulic hose 405 is connected on a second end to the skid steer, excavator or front-loader. Said second end is a female flat-faced coupler to which the first hydraulic hose 405 is sealed to, and ultimately drives the power to the hydraulic motor 500. The second hydraulic hose 410 is connected on a second end to the skid steer, excavator, or front-loader. Said second end is a male flat-faced coupler, that filters the power back into the equipment, and then recirculates the power back out through the second hydraulic hose 410 to the hydraulic motor 500. The hydraulic motor 500 is connected on a second end to the first end of the first hydraulic hose 405 and the first end of the second hydraulic hose 410. The hydraulic motor 500 located inside the housing 400, and further within the driving mechanism housing 800. The hydraulic motor 500 connects on a first end to the first driving mechanism 815 via a spline shaft 515 and a bolted flange 520. The housing 400 is welded on a first end to the second end of the machine side universal quick attach plate 300 and is bolted on a second end to the first end of the bearing 700 via the inner set of bearing bolts 701.

The housing 400 further comprises a driving mechanism housing 800 which is welded to the top and bottom extensions of the housing 400 and is bolted to the inside of the second end of the housing 400 at the gear 850 location. The driving mechanism housing is very similar to current WPA (FCA) worm gear speed reducer gearboxes and can be sized and outfitted according to the operator's specifications. The first driving mechanism 815 is a worm drive. The first driving mechanism 815 is connected on a first end to the first end of the hydraulic motor 500. The first driving mechanism 815 is connected on a bottom end to a worm wheel 820 via the meshing of the worm wheel 820 teeth and the first driving mechanism 815 teeth. The worm wheel 820 further comprises an output shaft located in the middle of it. The second driving mechanism 825 is a spur drive which latches on a first end to the output shaft of the worm wheel 820. The second driving mechanism 825 protrudes through the second end of the housing 400 and is located on a second end between the outside of the second end of the housing 400 and the first end of the second bearing mounting plate 625. The second driving mechanism 825 is bolted on a second end to the outside of the second end of the housing 400 and further comprises a gear 850. The gear 850 is always touching the bearing 700 via the teeth of both the bearing 700 and the gear 825 which drives the full three-hundred and sixty-degree rotation of the HRA 100 in the second embodiment.

Figure 5:
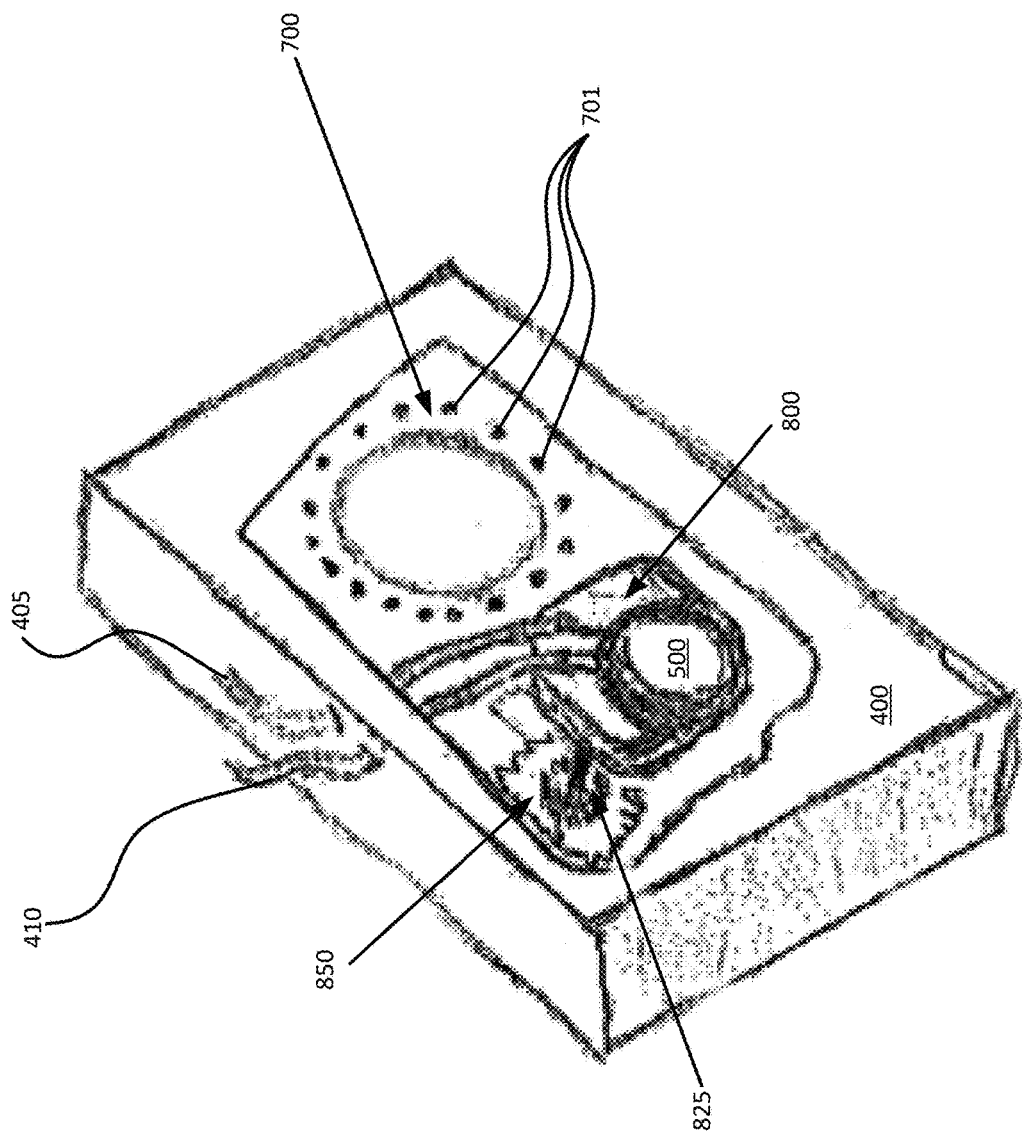
FIG. 5 is a partial cutaway view of a second embodiment housing 400 and driving mechanism housing 800 of a hydraulic rotator 100 according to the present invention.

With reference now to FIG. 5, a partial cutaway view of the second embodiment of the housing 400 and the driving mechanism housing 800 of the HRA 100 according to the present invention is provided. The housing 400 comprises the driving mechanism housing 800. Based on the angle and viewpoint of the Figure, the bearing 700 and the inner set of bearing bolts 701, which connect the first end of the bearing 700 to the second end of the housing 400 appear to be within the housing. They are not, this Figure is simply a cutaway view. The driving mechanism housing 800 further comprises a hydraulic motor 500, a first driving mechanism 815, and a second driving mechanism 825 further comprising a gear 850. The first 405 and second hydraulic hose 410 are connected on a first end to the second end of the hydraulic motor 500. The first driving mechanism 815 is connected on a first end to the first end of the hydraulic motor 500 and connected on a bottom end to the worm wheel 820 via the meshing of the worm wheel 820 teeth and the first driving mechanism 815 teeth. The worm wheel 820 further comprises an output shaft located in the middle of it where the second driving mechanism 825 latches to on a first end. The second driving mechanism 825 protrudes through the second end of the housing 400 and is located on a second end between the outside of the second end of the housing 400 and the first end of the second bearing mounting plate 625. The second driving mechanism 825 is bolted on a second end to the outside of the second end of the housing 400 and further comprises a gear 850. The gear 850 is always touching the bearing 700 via the teeth of both the bearing 700 and the gear 825 which drives the full three-hundred and sixty-degree rotation of the hydraulic rotator apparatus 100 in the second embodiment. The bearing 700

Figure 6:
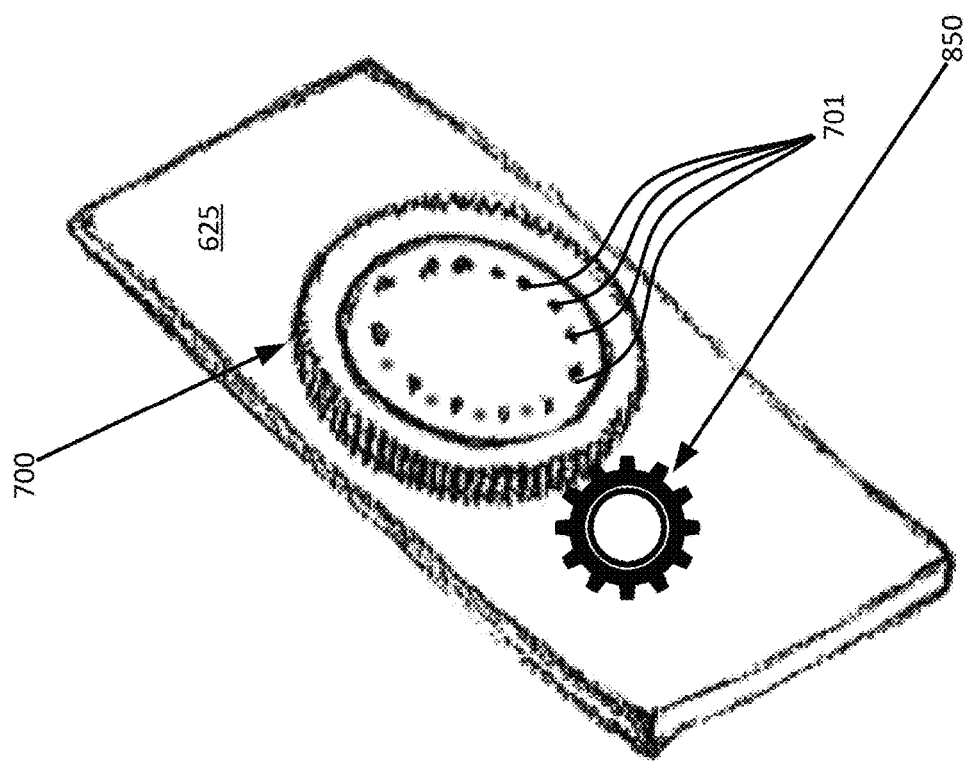
FIG. 6 is a perspective view of the bearing 700 and the first end of the second bearing mounting plate 625 of a second embodiment of a hydraulic rotator 100 according to the present invention.

With reference now to FIG. 6, a perspective view of the bearing 700 and the first end of the second bearing mounting plate 625 of a second embodiment of the HRA 100 according to the present invention is provided. The bearing 700 may either be centered, positioned to the left or to the right of the first end of the second bearing mounting plate 625. By changing the location of the bearing 700, an operator may have more rotational mobility for working against a fence or a building. The inner set of bearing bolts 701 connect the bearing 700 on a first end to the second end of the housing 400. The gear 825 teeth are always meshing with the bearing 700 teeth to drive the full three-hundred and sixty-degree, clockwise or counter clockwise, rotation of the hydraulic rotator apparatus 100.

Figure 7:
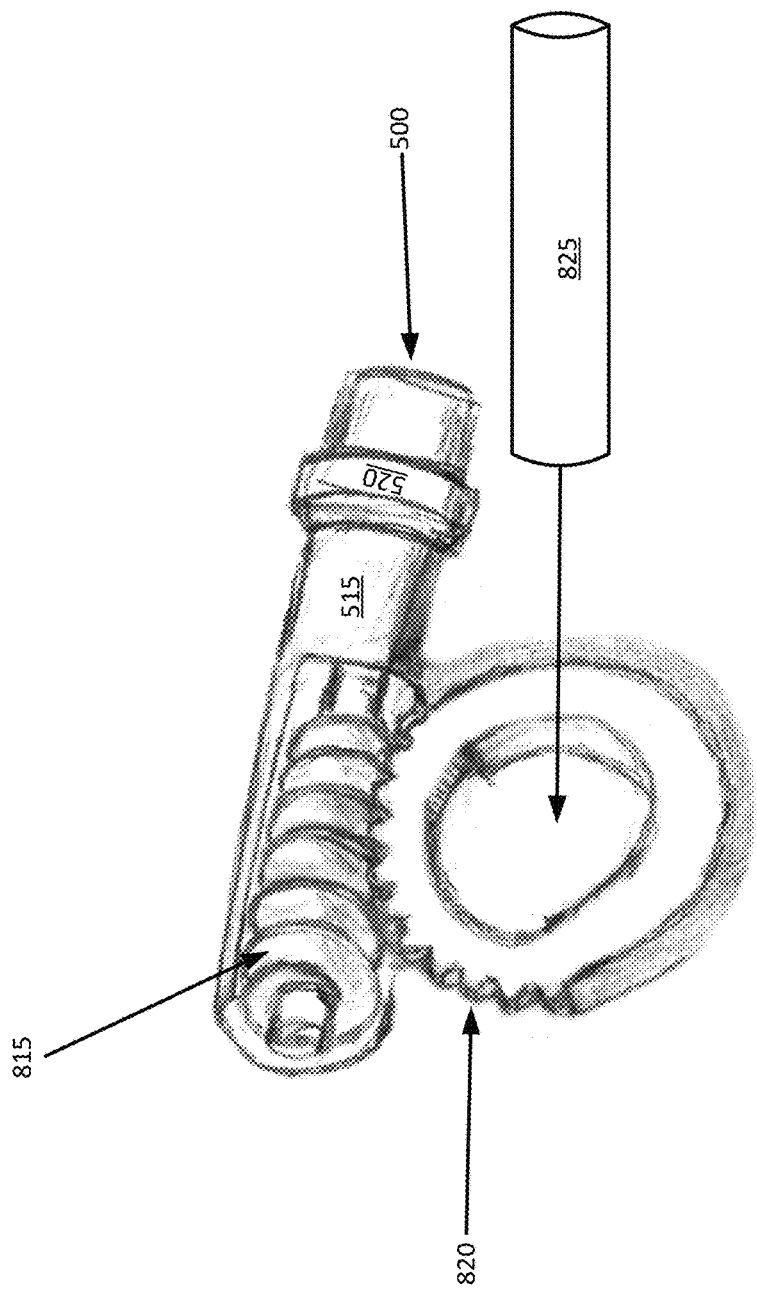
FIG. 7 is a partial cutaway view of the first driving mechanism 815, worm wheel 820 and second driving mechanism 825 of the second embodiment of a hydraulic rotator 100.

With reference now to FIG. 7, a partial cutaway view of the first driving mechanism 815, worm wheel 820 and second driving mechanism 825 of the second embodiment of the hydraulic rotator 100 is provided. The first driving mechanism 815 is a worm drive similar to that in the first exemplary embodiment, but there are distinct differences. The first driving mechanism 815 is connected on a first end to the hydraulic motor 500 via a spline shaft 515 and bolted flange 520. The first driving mechanism 815 is connected on a bottom end to a worm wheel 820 via the meshing of the worm wheel 820 teeth and the first driving mechanism 815 teeth. The worm wheel 820 further comprises an output shaft located in the middle of it. The second driving mechanism is a spur drive 825 which latches on a first end to the output shaft of the worm wheel 820.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A hydraulic rotator apparatus configured for attaching to a skid steer-type machine, the rotator apparatus comprising:
   a universal inner quick attach plate adapted to quickly and releasably secure to a corresponding equipment mounting plate of a vehicle equipment arm assembly of a skid steer-type machine, the vehicle equipment arm assembly comprising a first set of arms and a second set of arms, wherein the equipment mounting plate is secured to an operating end of a skid steer-type machine;
   an outer quick attach plate adapted to secure to an attachment;
   a drive assembly comprising a drive motor and a bearing, the drive motor secured to the inner quick attach plate and the bearing secured to the outer quick attach plate, the bearing mounted in an offset position with respect to the center of the outer quick attach plate; and
   wherein the drive assembly is adapted to rotate the outer quick attach plate relative to the inner quick attach plate about the offset bearing while subjected to the weight, torque load, and stress of the attachment.

2. The hydraulic rotator apparatus of claim 1 wherein the drive motor is secured to an inner bearing plate, the inner bearing plate secured to the inner quick attach plate.

3. The hydraulic rotator apparatus of claim 1 wherein the bearing is secured to an outer bearing plate, the outer bearing plate secured to the outer quick attach plate.

4. The hydraulic rotator apparatus of claim 1 wherein the drive motor is a hydraulic motor.

5. The hydraulic rotator apparatus of claim 4 wherein the hydraulic motor is connected to one of a skid steer, excavator, or front-loader by a set of hydraulic hoses which provide power to the hydraulic motor.

6. The hydraulic rotator apparatus of claim 1 wherein the bearing comprises an inner bearing surface and an outer toothed surface.

7. The hydraulic rotator apparatus of claim 6 wherein the drive motor comprises a drive gear having a set of drive teeth adapted to mechanically interface with the outer toothed surface of the bearing to transmit power from the drive motor to the bearing.

8. The hydraulic rotator apparatus of claim 6 wherein the drive gear is one of a worm gear or a cogwheel gear.

9. The hydraulic rotator apparatus of claim 1 wherein the bearing is a slew ring.

10. The hydraulic rotator apparatus of claim 7 wherein the drive gear is adapted to drive the bearing whereby the bearing and the outer quick attach plate are rotated about an axis perpendicular to the inner quick attach plate.

11. The hydraulic rotator apparatus of claim 1 wherein the drive assembly is a worm drive disposed between the outer and inner universal quick attach plates.

12. The hydraulic rotator apparatus of claim 1 further comprising:
   a housing having an interior and an exterior and secured to the inner quick attach plate;
   wherein the bearing is secured to the housing and to the outer quick attach plate; and
   wherein the drive assembly further comprises a drive gear adapted to transfer power from the drive motor to the bearing.

13. The hydraulic rotator apparatus of claim 12 wherein the drive motor is disposed in the interior of the housing.

14. The hydraulic rotator apparatus of claim 12 wherein the bearing is secured to a bearing plate, and wherein the bearing plate is secured to the outer quick attach plate.

15. The hydraulic rotator apparatus of claim 12 wherein the drive assembly further comprises a gearbox.

16. The hydraulic rotator apparatus of claim 1 wherein the drive assembly is adapted to rotate the outer quick attach plate 360 degrees about an axis perpendicular to the inner quick attach plate.

17. The hydraulic rotator apparatus of claim 12 wherein the drive assembly is adapted to rotate the outer quick attach plate 360 degrees about an axis perpendicular to the inner quick attach plate.

18. The hydraulic rotator apparatus of claim 12 wherein the bearing is a slew ring bearing, wherein the bearing is secured to the housing and to the outer quick attach plate such that the outer quick attach plate may rotate with respect to the housing.

19. The hydraulic rotator apparatus of claim 1, wherein the attachment is a Marshall tree saw.

20. A skid steer-type machine comprising:
   an equipment arm assembly comprising a first set of arms and a second set of arms;
   an equipment mounting plate; and a hydraulic rotator apparatus comprising:
  a universal inner quick attach plate adapted to quickly and releasably secure to the equipment mounting plate and equipment arm assemby, wherein the equipment mounting plate is secured to an operating end of the skid steer-type machine;
  an outer quick attach plate adapted to secure to an attachment;
  a drive assembly comprising a drive motor and a bearing, the drive motor secured to the inner quick attach plate and the bearing secured to the outer quick attach plate, the bearing mounted in an offset position with respect to the center of the outer quick attach plate; and
  wherein the drive assembly is adapted to rotate the outer quick attach plate relative to the inner quick attach plate about the offset bearing while subjected to the weight, torque load, and stress of the attachment.

* * * * *